(12) United States Patent
Fuqua

(10) Patent No.: US 6,701,869 B2
(45) Date of Patent: Mar. 9, 2004

(54) METHOD OF INCREASING HERD POPULATION AND PROFITABILITY WITH CONTRACT GROWERS

(76) Inventor: James Fuqua, 683 Lazy U Ranch Rd., Quanah, TX (US) 79252-8076

( * ) Notice: Subject to any disclaimer, the term of this patent is extended or adjusted under 35 U.S.C. 154(b) by 0 days.

(21) Appl. No.: 10/402,646

(22) Filed: Mar. 28, 2003

(65) Prior Publication Data

US 2003/0183175 A1 Oct. 2, 2003

Related U.S. Application Data

(60) Provisional application No. 60/368,346, filed on Mar. 28, 2002.

(51) Int. Cl.$^7$ ................................................. A01K 29/00
(52) U.S. Cl. ...................................................... 119/174
(58) Field of Search .............................. 119/174, 51.02; 705/3, 400, 414

(56) References Cited

U.S. PATENT DOCUMENTS

| | | | | |
|---|---|---|---|---|
| 4,280,448 A | * | 7/1981 | Ostermann | 119/842 |
| 4,288,856 A | * | 9/1981 | Linseth | 119/51.02 |
| 4,745,472 A | * | 5/1988 | Hayes | 348/141 |
| 6,318,289 B1 | * | 11/2001 | Pratt | 119/51.02 |
| 2003/0062001 A1 | * | 4/2003 | Andersson | 119/174 |
| 2003/0140865 A1 | * | 7/2003 | Fuqua | 119/174 |
| 2003/0177025 A1 | * | 9/2003 | Curkendall et al. | 705/1 |

* cited by examiner

Primary Examiner—Charles T. Jordan
Assistant Examiner—Elizabeth Shaw
(74) Attorney, Agent, or Firm—David W. Carstens; Carstens Yee & Cahoon, LLP

(57) ABSTRACT

The present invention relates to an improved cattle management method utilizing a franchised cattle management system licensed to contract cattle producers. The contract grower contract producers manage cattle according to given production guidelines from the franchiser that increases the carcass value at sale. The cattle producer retains a profit from the increased market value of the cattle produced according to the franchisor's cattle production method. The franchiser receives a royalty from the contract cattle producer with little or no capital expenses or costs associated with the maintenance and production of the cattle herd operated by the contract cattle producer.

12 Claims, 4 Drawing Sheets

Figure 2

QUALITY GRADING

| |
|---|
| USDA Prime |
| USDA Choice |
| USDA Select |
| USDA Standard |
| USDA Commercial |
| USDA Utility |
| USDA Cutter |
| USDA Canner |
| |

YIELD GRADING

| |
|---|
| USDA Yield Grade 1 |
| USDA Yield Grade 2 |
| USDA Yield Grade 3 |
| USDA Yield Grade 4 |
| USDA Yield Grade 5 |

METHOD OF INCREASING HERD POPULATION AND PROFITABILITY WITH CONTRACT GROWERS

RELATED APPLICATIONS

This application claims the benefit, under 35 U.S.C. §119(e)(1), of U.S. Provisional Application Serial No. 60/368,346, filed Mar. 28, 2002, which is incorporated herein by this reference.

BACKGROUND OF THE INVENTION

1. Technical Field

The present invention relates generally to the management of cattle for prime meat quality and improved investment returns to the producer. More specifically, the invention relates to methods for analyzing and improving the carcass value of beef cattle for the production of beef for human consumption by measuring, sorting and tracking animals individually and in groups for increased market value and better beef quality.

2. Description of Related Art

The cattle industry is constantly changing. Although some may disagree, cattle producers are in the food provision business in contrast to the ranching business. Beef production competes with other sources of protein available on the market, some of which are less expensive compared to the cost of steak, since steak or beef is considered a luxury item in most households both domestically and internationally.

When people buy or order a steak they expect to have an enjoyable culinary experience. A recent national survey showed that twenty percent of the time people do not have an enjoyable steak dining experience in part due to poor meat quality. Poor meat quality may arise from many different factors. One of the largest factors affecting meat quality is the breed of cattle being "grown" for meat production. In efforts to increase production, some cattle producers produce larger amounts of red meat by utilizing large cattle breeds, which are primarily used as working animals, instead of slaughter cattle. As a result, the palatability characteristics of the meat produced from the larger cattle breeds suffer. Likewise, the conditions in which cattle are raised and maintained affects the meat characteristics of slaughter cattle. Exposure to prolonged periods of heat, shortages of food or water, and the vaccination program administered by the cattle producer affect the palatability and, thus the carcass prices, of the cattle sold for slaughter.

With regard to the mechanics of cattle sales, the long term practice of buying cattle on the average has allowed undesirable types of cattle to sell for a premium at the expense of the more desirable beef quality type of cattle. This result was in large part due to the economics of the cattle market. The beef packer buyer bought a large number of cattle based on the average value of all cattle purchased by the packer. This resulted in a price differential wherein the only cattle priced correctly were the average cattle. The poor quality cattle received a premium price, greater than their true carcass value, and higher quality cattle were discounted to make up the losses in the lower quality cattle. This practice encouraged cattle producers to do less than an adequate job in the selection of bulls and cows for slaughter cattle breeding and has allowed the cattle producer to raise and sell undesirable, low grade cattle and still obtain a premium price at sale. The net result of these production and buying methods has resulted in a steady decline in the consumption of beef by the market over the last twenty-five years.

Recently, the United States cattle market economy significantly changed. Beef packing companies had been buying cattle on a formula and cash basis and thus owned, or at least controlled, a large number of the available slaughter cattle population. The formula and cash basis was derived from cattle buying which occurred during the first two days of the business week. This trading set the market price and all cattle would trade thereafter in this price range during the remaining business week. Suddenly, large corporate beef packers started declining to buy on the formula driven markets and began to process beef which had been previously purchased. In effect, large packing companies left the market leaving smaller beef packers and independent dealers with an open trade cattle market, which resulted in a market price drop. Shortly thereafter, corporate beef packing companies reentered the cattle market and began buying slaughter cattle at much lower prices.

This change in purchasing by the beef packing industry caused slaughter cattle producers to realize that the quality of the live cattle carcass is just as important to the producer as it is to the beef packer. Market purchasing trends have placed additional investment risks on the cattle producer to bear increasing responsibility for potential diminution in the carcass value of the cattle being processed. As a result, formula pricing has been relegated as a past stopgap measure rarely used in the present cattle trading markets. Cattle market participants have now created a cattle market based on the value of the processed product which has required cattle producers to consider the "end product" value of the cattle they produce and sell.

The prior art has developed innovative technological improvements in live animal carcass evaluation. These improvements have become prominently used in cattle feed yards and production facilities. For example, U.S. Pat. No. 4,745,472 (Hayes) has proposed a method to accurately measure an animal's external dimensions by scanning using video imaging techniques. Similarly, ultrasound backfat measurement of cattle is known, at least on an experimental basis, from the work of Professor John Brethour of Kansas State University's Fort Hayes Experimental Station, as disclosed in an article entitled "Cattle Sorting Enters a New Age" appearing at pages 1–5 and 8 of the September, 1994 issue of D. J. FEEDER MANAGEMENT. Professor Brethour has, on an experimental basis, used the data from such measurements to project an estimated optimum shipping or end date for the measured animals. Also, various methods of sorting and weighing cattle have been known or proposed, as disclosed in U.S. Pat. No. 4,288,856 (Linseth) and U.S. Pat. No. 4,280,448 (Ostermann).

Cattle Scanning Systems of Rapid City, S. Dak., markets a computerized video imaging and sorting system that includes weighing and scanning external dimensions of each animal, assigning a frame score and muscle score to the animal based on such dimensions, calculating a predicted optimal end weight and marketing date from the composite score and current weight data, and then sorting the animals for feeding according to their optimal marketing dates. Feedlots across the country are equipped with ultrasound machines that measure cattle rib size, back fat thickness and marbling scores before the animal is processed. The characteristics of calves are now measured at weaning so that calves with desirable beef traits can be sorted and monitored early based on carcass quality. Due to these technological improvements, cattle displaying characteristics of high beef quality will enjoy a consistent premium market price, while the rest will sell at lower prices.

In light of the ever changing cattle market, a need exists for an improved method of managing cattle production by the cattle producer. Likewise, a need exists for an improved method of managing cattle which spreads the risk of investment loss among a plurality of parties and increases the likelihood of profit from the sale of slaughter cattle for the parties involved in the production and sale of cattle.

SUMMARY OF THE INVENTION

The present invention relates to an improved cattle management method utilizing a franchised cattle management system licensed to contract cattle producers. The contract grower producers manage cattle according to given production guidelines from the franchisor that increase the carcass value at sale. The increased carcass value is in large part attributable to selective breeding and physical maintenance guidelines implemented by the contract producer. In return, the contract grower sells a determined population of the herd to the franchisor at or above a guaranteed purchase price made by the franchiser thereby minimizing the risk of loss associated with lower market prices which may exist at the time of sale. Likewise, the franchisor has expanded its ability to increase the herd population without having to expend capital in purchasing land and other resources. The net result is an increased likelihood of generating larger profits for both the franchisor and contract grower derived from the sale of high grade and high quality beef as a result of the cattle management method, reduced exposure to fluctuating market prices and reduced operating costs and expenses.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a chart depicting the various United States Department of Agriculture (USDA) yield and meat grades which guide the evaluation of slaughter cattle;

DETAILED DESCRIPTION OF THE PREFERRED EMBODIMENT

Figure 1:
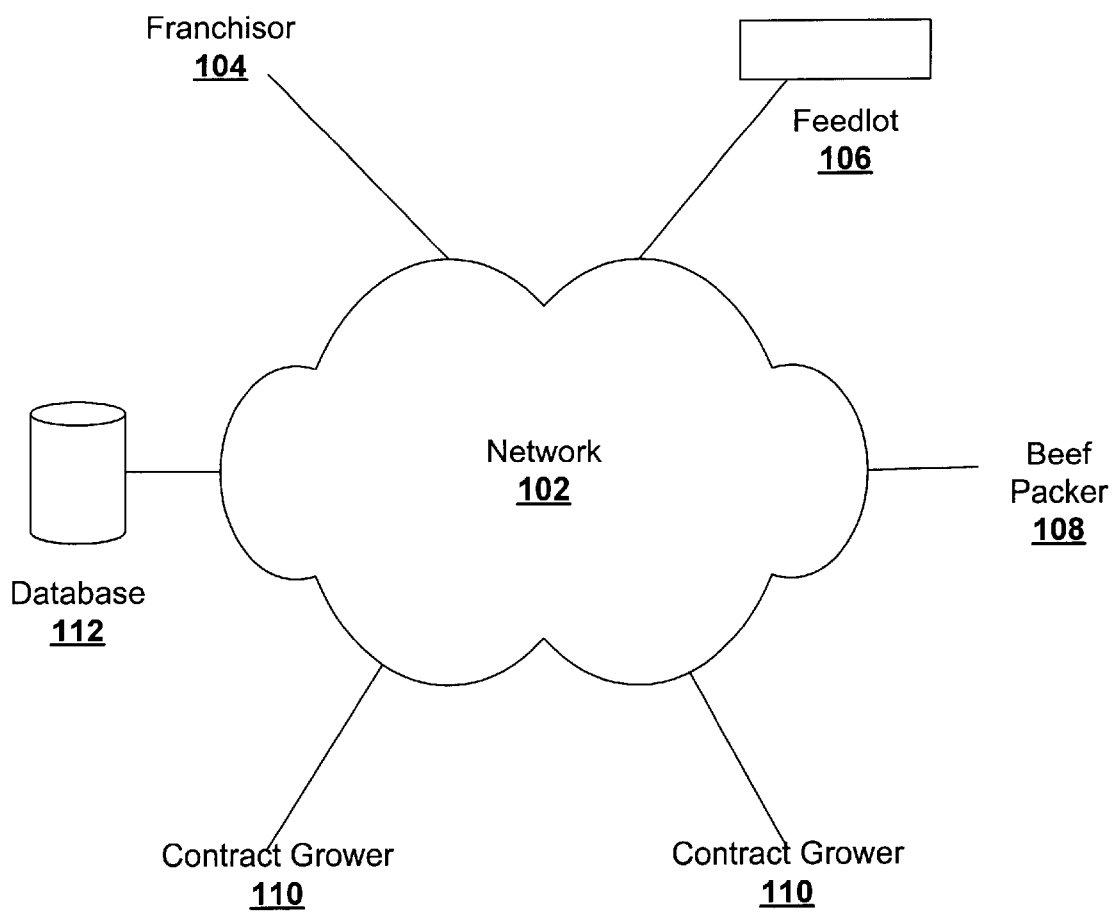
FIG. 1 is a network diagram depicting the organization of the franchiser and contract cattle producer as herein disclosed.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a franchiser computer or server 104 is connected to network 102 along with storage unit 110. In addition, clients 106, 108 and 110 also are connected to network 102. These clients 106, 108 and 110 may be, for example, personal computers or network computers representing a feedlot, a beef packer and contract growers, respectively. For purposes of this application, a network computer is any computer coupled to a network, which receives a program or other application from another computer coupled to the network. In the depicted example, server 104 provides data, such as boot files, operating system images, and applications to clients 106, 108, 110. Clients 106, 108 and 110 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

With reference now to FIG. 2, information related to the various USDA yield and meat grades assigned to slaughter cattle are shown. Slaughter cattle are graded according to the quantity and quality of meat produced from the cattle carcass. As such, the grades are based on two factors (1) the quality or palatability of the beef which are indicators of the meat lean referred to as "quality grade" and (2) the quantity or cutability of the meat based on the percentage of the carcass containing the major retail cuts of trimmed boneless meat which is identified as the "yield grade."

USDA Quality Grades are used to predict the palatability of meat from a beef animal or carcass, using carcass physiological maturity and marbling to determine the USDA grade. Beef quality refers to the expected eating characteristics (tenderness, juiciness, and flavor) of the cooked product. USDA Quality Grades are used to reflect differences in expected eating quality among slaughter cattle and their carcasses. The eight USDA quality grades for beef are shown in FIG. 2. Eating quality generally is most desirable for "Prime beef" and least desirable for "Canner beef."

The Quality Grade of a beef carcass is determined by evaluating carcass indicators of physiological maturity and marbling. The age of a beef animal has a direct effect on tenderness of the meat it produces. As cattle mature, their meat becomes progressively tougher. To account for the effects of the maturing process on beef tenderness, evaluations of carcass maturity are used in determining USDA Quality Grades. Beef carcass maturity is determined by evaluating (a) the size, shape and ossification of the bones and cartilages in the carcass, and (b) the color and texture of the ribeye muscle.

In younger animals, there is a piece of cartilage on the top of each bone in the vertebral column. During maturation, these regions of cartilage gradually change to bone. This ossification process normally occurs in a definite measurable pattern. The sacral vertebrae usually show the first signs of ossification. Ossification gradually progresses toward the head through the lumbar region and, finally, through the thoracic regions of the backbone.

Within a maturity group, marbling (the amount and distribution of intramuscular fat) within the ribeye is the primary determinant of USDA Quality Grade. Visual evaluations of marbling in the ribeye are related to differences in eating quality of beef. Beef cuts with high levels of marbling are more likely to be tender, juicy and flavorful than cuts with very low levels of marbling. Market studies suggest that beef from carcasses grading at least USDA Select is likely to be acceptable in eating quality for most consumers. After maturity and marbling are determined, these two factors are combined to determine USDA Quality Grade. Generally, the Prime, Choice, Select and Standard grades are restricted to beef from young cattle. The Commercial, Utility, Cutter and Canner grades normally are comprised of carcasses produced by cattle of advanced maturity. Carcasses produced by bullocks are eligible only for the Prime, Choice, Select, Standard and Utility Grades, while mature bulls are ineligible for Quality Grading.

USDA Yield Grades estimate beef carcass cutability, which is defined as the combined yield of closely trimmed, boneless retail cuts (% CTBRC) from the round, loin, rib and chuck. This is an estimate of the relative amount of lean, edible meat from a carcass. There are five Yield Grades for slaughter cattle and beef carcasses. The lower the numerical value of the USDA Yield Grade, the higher the yield of closely trimmed, boneless retail cuts. USDA Yield Grades are used to estimate the expected edible lean meat, with a USDA YG 1 being the leanest and a USDA YG 5 being the fattest.

The Yield Grade of a beef carcass is determined by evaluating the following factors: (1) external fat thickness over the ribeye, (2) ribeye area, (3) estimated percentage of kidney, pelvic and heart fat (% KPH), and (4) hot carcass weight. Fat thickness is measured at a point three-fourths of the distance of the length of the ribeye from its chine bone side. This single measurement is a reasonably accurate predictor of overall carcass fatness; however, to improve the accuracy of the predictions of overall carcass fatness, the fat thickness measurement usually is adjusted up or down by the grader to account for visible differences in the distribution of external fat in other areas of the carcass.

The relationship between ribeye area and carcass weight is used in Yield Grading beef carcasses to reflect differences in cutability stemming from carcass muscularity. Ribeye area normally ranges from about 9 to 17 square inches among carcasses of common weights and can be measured using the plastic grid. Fat deposits around the kidney and heat, and in the pelvic cavity, typically are left in the carcass during the slaughter process and affect carcass cutability. Most carcasses have 1% to 4% of the carcass weight represented as kidney, pelvic and heart fat.

The formula for calculating Yield Grade is:

$$YG = 2.5 + (2.5 \times \text{adjusted fat thickness, in.}) + (.20 \times \text{KPH \%}) - (.32 \times \text{ribeye area, sq. in.}) + (.0038 \times \text{hot carcass weight, lbs.})$$

While the USDA Grader may use this equation occasionally, most determinations are based upon the Grader's experience and training, checking occasionally with the formula when requested to do so. The same holds true for the Grader's determination of the USDA Quality Grade.

Consumers and producers often do not have a clear understanding of beef grading. Beef grades are of two types, Quality Grades and Yield Grades. Most consumers are familiar with the names of several Quality Grades and may use them as a selection criterion when purchasing at retail. However, Yield Grades have less direct impact on consumer selection decisions. Producers, on the other hand, depend greatly on both Quality and Yield Grades as a marketing tool for beef cattle and carcasses.

Figure 3:
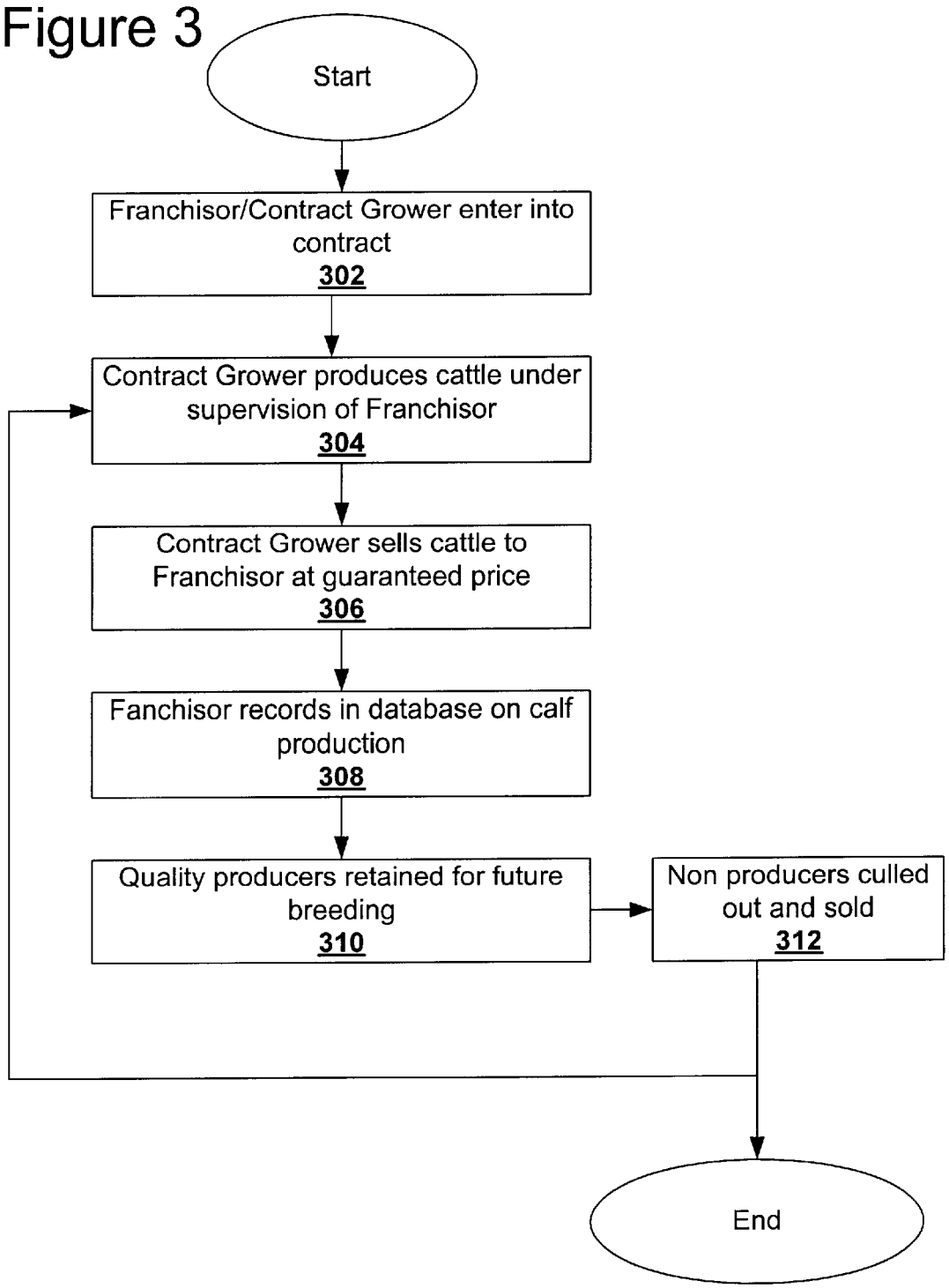
FIG. 3 is a flow chart depicting a method of cattle herd management.

FIG. 3 is a flow chart depiction of the present invention showing the method of cattle production designed by the franchiser for implementation by the contract grower. Initially, the franchiser and contract grower enter into a contract governing the relationship between the parties (Step 302). Next, proprietary cattle breeding, genetics and vaccination programs developed by the franchiser are instituted by the contract grower (Step 304). In return, the franchiser guarantees a sale price for a selected yield and/or quality grade of cattle produced by the contract grower for that particular season (Step 306). Alternatively, the contract grower may retain the calves produced that season and "stock" the contract grower herd with genetically superior bulls and heifers for calf production the following year. The cattle selected for sale that season are sent to a feedlot for weight maximization, while a sale price is negotiated between the franchisor or contract grower with the beef packer and/or feedlot based on live carcass weight and other physical characteristics. The cattle are then processed and carcass data is provided to and recorded by the franchiser directly from the packer or by a third party service (Step 308). This data is stored in the franchisor's database and a copy may be relayed to the contract grower for his records. From this data, the franchiser makes determinations on future breeding and vaccination program adjustments to optimize calf production for the next season by retaining cattle which display desired beef quality characteristics for future breeding (Step 310) and culling and selling off cattle with little or no reproductive or genetic value (Step 312).

Figure 4:
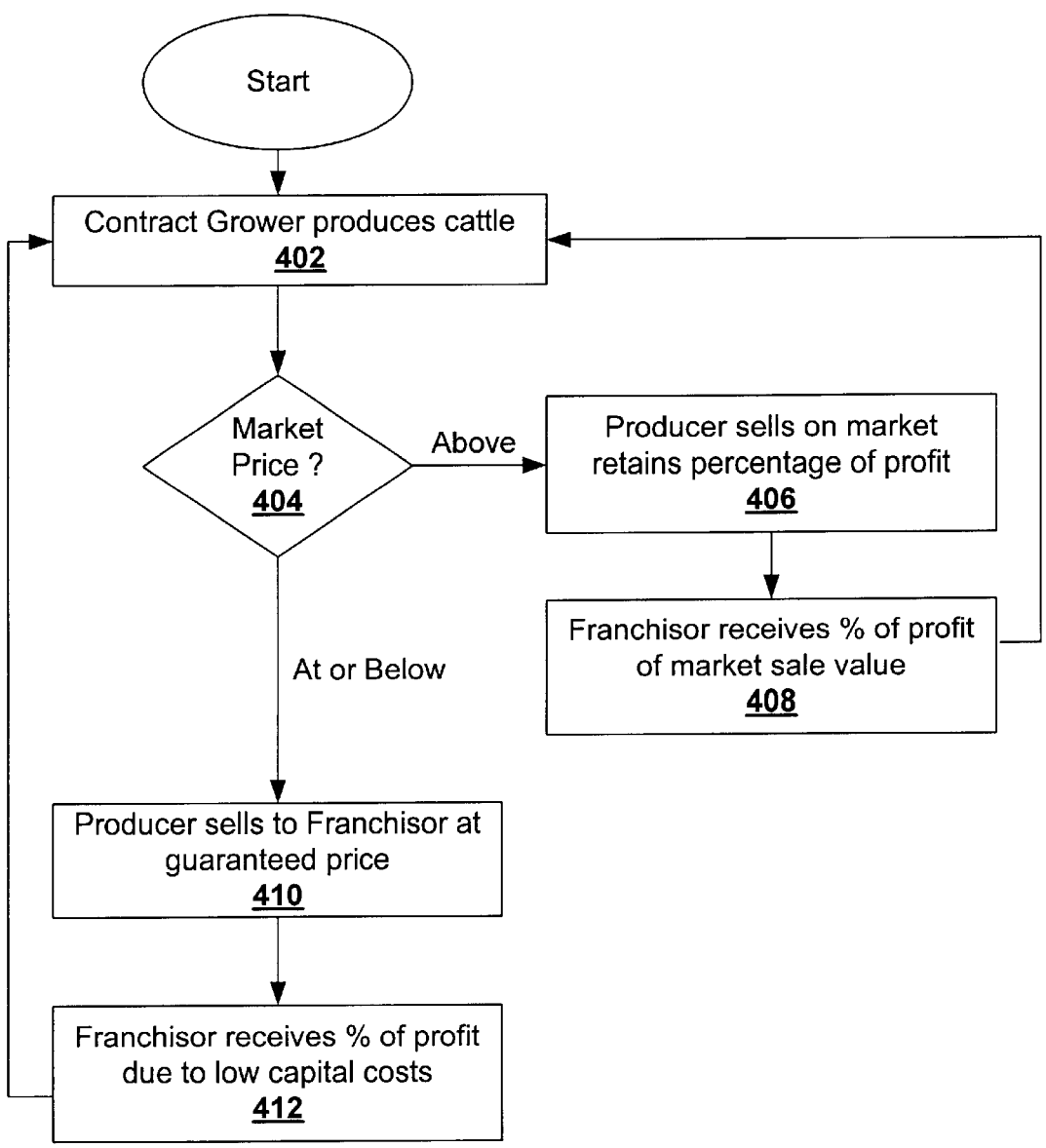
FIG. 4 is a flow chart depicting the economic maximization of profit associated with the method disclosed herein.

FIG. 4 is a flow chart showing the economic maximization of profit for both the franchiser and contract grower arising from the method disclosed herein. Initially, the franchiser and contract grower have entered into an agreement whereby the contract grower produces cattle according to the proprietary fertility, vaccination, and stress reducing methods of production developed by the franchisor (Step 402). For example, a consistent cattle vaccination program will minimize sickness and death among the herd. Improving the uniformity of the calving "season" will aid in the recognition and sale of poor quality or non-producing cows and replacing them with more efficient and younger heifers. Likewise, reducing the environmental stress by uniform and consistent watering, feeding and vaccination improve the overall health of the herd and beef quality characteristics. After the cattle selected for sale and processing have been identified, the market price of the sale cattle is considered by the contract grower (Step 404). If the producer's cattle sell at a price above existing market prices, the producer sells the cattle and retains a percentage of the profits (Step 406), while the remaining profit is paid to the franchiser as a royalty under the franchise agreement (Step 408). Alternatively, if the producer's cattle price at or below existing market prices, the producer sells a predetermined number of cattle to the franchisor at a guaranteed price at or above market prices (Step 410). Likewise, the franchiser still profits from this sale as the franchiser has very little, if any, capital expenses and costs in the actual management of the contract grower's cattle herd (Step 412).

What is claimed is:

1. A method of increasing herd population and profitability comprising:

identifying at least one animal with a desired beef characteristic;

maintaining the at least one animal with a desired beef characteristic in accordance with a predetermined animal maintenance plan; and, selling the at least one animal for a guaranteed price.

2. The method of claim 1 further comprising:

storing a characteristic of the at least one animal in a database.

3. The method of claim 2 wherein the at least one characteristic is a genetic trait of the at least one animal.

4. The method of claim 2 wherein the at least one characteristic is the quality grade of the at least one animal.

5. The method of claim 2 wherein the at least one characteristic is the yield quality of the at least one animal.

6. The method of claim 1 further comprising:

franchising the usage of the predetermined animal maintenance plan to at least one contract grower.

7. The method of claim 1 further comprising:

allocating the economic risk associated with the production of cattle between at least one franchiser and the at least one contract grower.

8. The method of claim 1 wherein the identified beef characteristic is the live carcass weight of the at least one animal.

9. The method of claim 1 wherein the identified beef characteristic is the yield grade of the at least one animal.

10. The method of claim 1 wherein the identified beef characteristic is the quality grade of the at least one animal.

11. The method of claim 1 wherein the maintenance of the at least one animal is comprised of at least one vaccination occurring before the at least one animal is weaned.

12. The method of claim 1 wherein the maintenance of the at least one animal is comprised of at least one vaccination occurring before the at least one animal is sent to a feedlot.

* * * * *

UNITED STATES PATENT AND TRADEMARK OFFICE
CERTIFICATE OF CORRECTION

PATENT NO. : 6,701,869 B2
DATED : March 9, 2004
INVENTOR(S) : James Fuqua

It is certified that error appears in the above-identified patent and that said Letters Patent is hereby corrected as shown below:

<u>Column 3,</u>
Line 14, after "value at sale.", start a new paragraph beginning with the sentence "The increased carcass value is in large part".

<u>Column 4,</u>
Line 43, first word, "expected" should be in italic.

<u>Column 5,</u>
Line 46, first word, delete "heat", insert -- heart --.

Signed and Sealed this

Twenty-first Day of September, 2004

JON W. DUDAS
*Director of the United States Patent and Trademark Office*